United States Patent [19]

Delignieres

[11] Patent Number: 4,932,006
[45] Date of Patent: Jun. 5, 1990

[54] PROCESS FOR SIGNAL TRANSMISSION WITHOUT ELECTRIC CONNECTION THROUGH A CONDUCTING WALL, THE HULL OF A SHIP FOR EXAMPLE, AND A DEVICE FOR IMPLEMENTING SAME

[75] Inventor: Robert Delignieres, Mareil Marly, France

[73] Assignee: Institut Francais du Petrole, Rueil-Malmaison, France

[21] Appl. No.: 591,963

[22] Filed: Mar. 21, 1984

[30] Foreign Application Priority Data

Mar. 28, 1983 [FR] France ............................ 83/05185

[51] Int. Cl.$^5$ .......................................... H04B 11/00
[52] U.S. Cl. ................. 367/134; 340/870.31; 340/870.32; 455/41; 324/263
[58] Field of Search .............. 367/87, 117, 131, 134, 367/137, 138, 142, 148, 903, 910; 181/0.5, 139, 140, 142, 400; 455/41; 179/82; 178/43; 340/310 R, 870.31, 870.32; 324/263, 67

[56] References Cited

U.S. PATENT DOCUMENTS

| | | | |
|---|---|---|---|
| 3,441,901 | 4/1969 | Cawley et al. | 367/134 X |
| 3,668,321 | 6/1972 | Lang | 179/82 X |
| 3,829,765 | 8/1974 | Siler | 324/67 |
| 3,978,469 | 8/1976 | Schaad et al. | 179/82 X |
| 4,312,001 | 1/1982 | Marzolf | 340/870.32 X |
| 4,324,135 | 4/1982 | Peyton | 367/134 X |

Primary Examiner—Charles T. Jordan
Assistant Examiner—J. Woodrow Eldred
Attorney, Agent, or Firm—Antonelli, Terry, Stout & Kraus

[57] ABSTRACT

A process is provided for transmitting a signal, without material connection, through a conducting wall which may be a ship's hull, to external user apparatus.

A current supplied by a generator and whose intensity is proportional to the amplitude of the signal to be transmitted is applied between two points on the hull. The magnetic field variations generated by the passage of the current are detected by a sensor on the other side of the hull and, suitably amplified, are used for controlling an apparatus.

8 Claims, 1 Drawing Sheet

4,932,006

PROCESS FOR SIGNAL TRANSMISSION WITHOUT ELECTRIC CONNECTION THROUGH A CONDUCTING WALL, THE HULL OF A SHIP FOR EXAMPLE, AND A DEVICE FOR IMPLEMENTING SAME

BACKGROUND OF THE INVENTION

1. Field of the invention

The invention relates to a process for signal transmission without electric connection through a conducting wall, which may for example be the hull of a ship, and a device for implementing same.

The process of the invention may be used for example in the field of ultra-sonic remote detection.

2. Description of the Prior Art

Sonar systems generally comprise transmitter-receiver transducers disposed inside the hull of ships and connected to a signal generator by electric conductors passing through the walls of the ship. Preferably, these transducers are housed in shaped bodies fixed to the hull. The installation of the different elements of an ultra-sonic remote detection system on board a ship requires the system to be adapted at least to allow signal transmission cables to pass through the hull to the ultrasonic transmission-reception means. Such adaptation, which is costly, for it very often requires placing the boat in a dry dock, is not always desirable especially when the ultra-sonic remote detection system is only installed temporarily, for the requirements of a particular application.

The signal transmission process of the invention allows a boat to be very easily equipped with an acoustic remote detection system, without requiring modification of the hull.

SUMMARY OF THE INVENTION

The process of the invention comprises the application to the conducting wall, on one side thereof, of an electric current dependent on the signal to be transmitted and the detection, on the other side of the wall, of the magnetic field generated by the current flow and proportional to the amplitude thereof.

In one particular embodiment the current generated is applied between distinct points on the hull of a ship on one side thereof and the detection of the magnetic field is carried out on the other side, on the outside for example.

Since transmission of the signal is effected without material connection, the control of the apparatus fixed to the outside of the hull of a ship for example is facilitated. If, furthermore, the external apparatus are fixed magnetically, any system using these apparatus and in particular any ultra-sonic pulse remote detection system may be rapidly installed temporarily on the hull of a ship.

BRIEF DESCRIPTION OF THE DRAWINGS

Other features and advantages of the process and of the device for implementing same will appear from reading the description of a particular embodiment described by way of non limiting example with reference to the accompanying drawings in which.

DESCRIPTION OF THE PREFERRED EMBODIMENT

Figure 1:
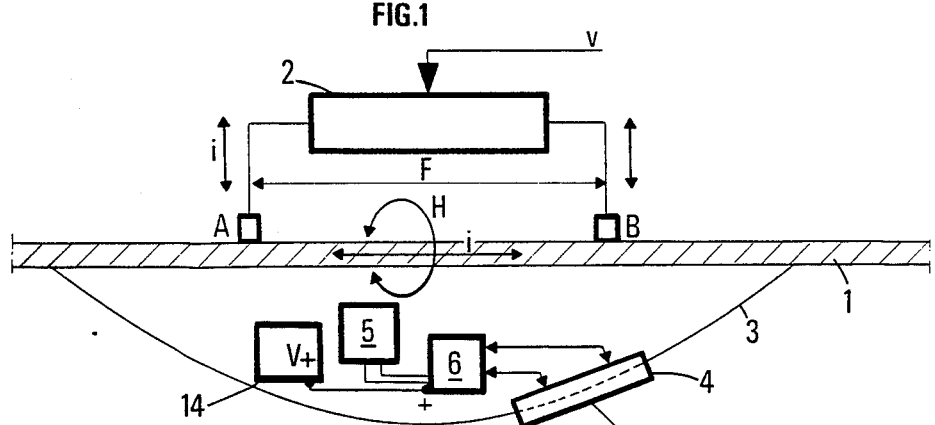
FIG. 1 shows schematically the transmission assembly.

Referring to FIG. 1, it can be seen that the process of the invention consists essentially in causing an AC current i to flow between two distinct locations A and B on the metal hull 1 of a boat, said AC current being produced by a current generator 2 and being proportional at all times to a signal V which is applied to its input. An electric circuit F connects the points of application A and B to the terminals of generator 2. Since the electrical resistance of water is very much greater than that of the hull and since this latter is relatively isolated from water by protective coats of point, by oxidation and/or deposits or sediments, the largest part of the electric current i flows in the metal sheets of the hull between the two points of application A and B and this current generates a magnetic field H outside of the hull.

On the outside of the hull is disposed a user apparatus. Preferably this apparatus is contained in a shaped body 3 fixed to the hull be magnetic means, for example, so as to be able to fit it and remove it rapidly. The apparatus includes for example an electro-acoustic transducer 4 connected a transmitter 6, which is fed with electricity by an electric current source 14.

The magnetic field H generated by the flow of 10 current in the hull is detected by a magnetic sensor 5. such as a coil or a Hall effect device or magneto-resistive probe the output signal of which is applied to the transmitter 6, which amplifies it before applying it to the transducer 4.

The signal v applied to the current generator 2 is, in this embodiment, an AC electric voltage of given frequency f and duration $\Delta t$.

Figure 2:
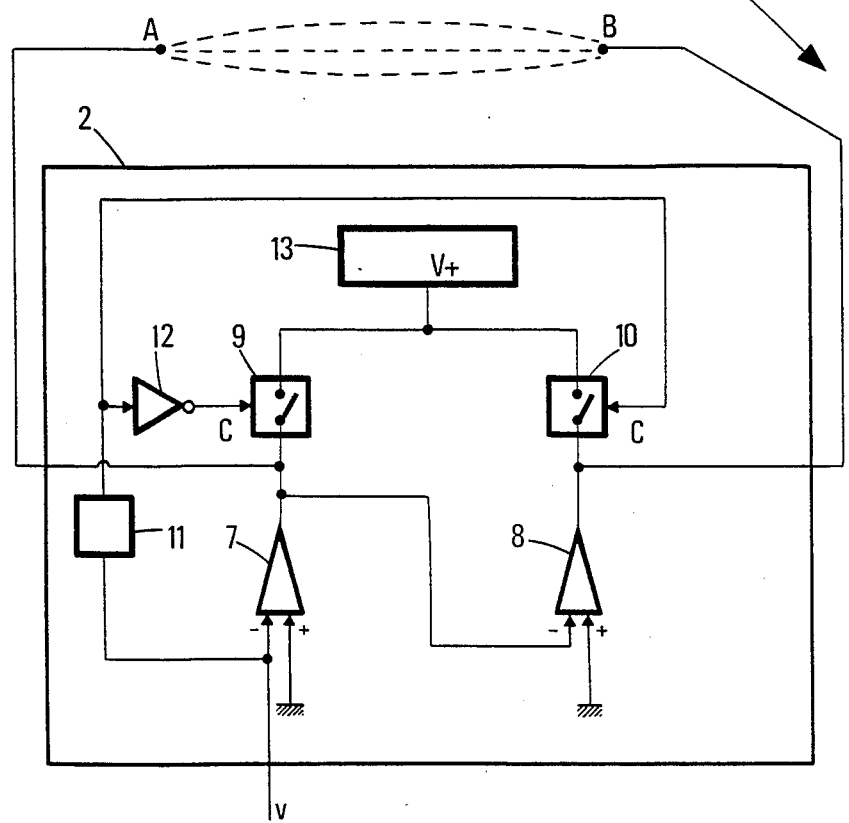
FIG. 2 shows schematically an AC current generator producing the electric current which is caused to flow in the conducting wall.

The current generator 2 as shown in FIG. 2, comprises two amplifiers 7, 8 whose outputs are connected respectively to the points of application A and B on the hull of the boat on the one hand, and to two switches 9, 10, on the other hand, which switches are adapted in the closed position to put points A and B at the positive voltage V+ delivered by an electric current source 13.

These switches 9, 10 are preferably of the electronic type, such as a field effect transistor, and operate to close when a signal of logic level 1 is applied to the control input thereof.

The input signal v is applied to the inverter input of amplifier 7 and to the input of a shaping element 11 of the Schmitt trigger type. The logic signal available at the output of this shaping element 11 is applied to the control input C of switch 10 and to the input of a logic inverter 12, the output of this inverter 12 being connected to the control input C of switch 9. The output of amplifier 7 is also connected to the inverter input of amplifier 8.

The current generator 2 operates in the following way: with a periodic signal applied to the inverter input of amplifier 7, the positive half period of the input signal V is transformed by trigger 11 into an electric voltage of logic level 1 which causes switch 10 to close and, inverted by the logic inverter 12, causes switch 9 to open. Since the electric voltage source 13 is at that time connected "through the conductive circuit from point B to point A on the hull" to the output of amplifier 7 and since the internal resistance of amplifier 7 varies as a function of input signal v, a current proportional to this voltage passes from point B and to point A through the hull of the boat. In this case, the output of the amplifier 8 will have a positive polarity due to the double inversion of the input signal v by the amplifiers 7 and 8.

the negative half period of the input signal v which follows is transformed by trigger 11 into a signal of logic level 0, which causes switch 10 to open and, inverted by the logic inverter 12, causes switch 9 to close. Since the electric current source 13 is at that time connected "through the conductive circuit from point A to point B on the hull"; to the output of amplifier 8 and since the internal resistance of amplifier 8 varies as a function of input signal v, a current proportional to this voltage will pass from point A to point B, in a direction opposite that of the current passing through the hull during the preceding half period of the signal. In this case, the output of the amplifier 7 will have a positive polarity due to inversion of the input signal by the amplifier 7.

The variable magnetic field H, proportional to the instantaneous amplitude of the oscillating current passing between points A and B on the hull, is picked up by the magnetic sensor 5 (FIG. 1) and, suitably amplified by the transmitter 6, is applied to the electroacoustic transducer 4.

The device described may be used for example for implementing the method of remote acoustic measurement described in published French patent application No. 2 519 424 comprising the successive transmission from three electro-acoustic transducers contained in shaped bodies, fixed at three different locations on the hull of a boat, of three acoustic pulses, reception thereof by a transducer-receiver disposed on an immersed fish towed at the end of a cable and transmission to the boat through said cable of the telemetric measurements effected from these impulses. In this case, the currents proportional to the signals to be transmitted are applied successively between three pairs of points A, B at distinct locations on the hull, in the vicinity of the shaped bodies containing the three electro-acoustic transducers.

The described device may also be used in combination with an echo-sounding system or a Doppler effect navigational apparatus where the echos of the pulses transmitted from a transducer, such as the transducer 4 and back scattered by the sea bed or the water mass, are received by the same transducer. In this case, the signals picked up are suitably amplified and a current generator similar to generator 2 is also housed in the shaped body 3 and is adapted to apply to the wall of the boat a proportional electric current which generates a variable magnetic field picked up inside the hull in the manner already described.

The process of the invention may also be used for transmitting a movement without mechanical connection by making points A and B where the current is applied moveable. The magnetic field variations resulting from the movement of current lines A-B are detected on the other side of the hull and used for reproducing a movement similar to the one which gave rise to the magnetic field variations.

By moving points A and B over a face of the wall along a circumference, a motor for example may be caused to rotate for actuating different members.

What is claimed is:

1. A process for transmitting a variable amplitude signal through the hull of a ship without piercing the hull to effect electrical connection therethrough, comprising generating, on one side of the hull, an electric current whose intensity is proportional to the amplitude of the signal to be transmitted; applying the generated current to the hull inside the ship between distinct locations thereon; detecting, on the other side of the hull, the magnetic field generated by the flow of the current between the distinct locations on the hull; and generating a signal on said other side of the hull which is proportional to the amplitude of said detected magnetic field.

2. A device mounted on a ship for transmitting a variable amplitude signal through the hull of the ship without piercing the hull to effect electrical connection therethrough, comprising at least one transmission assembly disposed inside the hull and including current generator means for generating between output terminals thereof a current whose amplitude is proportional to the amplitude of the signal to be transmitted and an electric circuit connecting the output terminals of said current generator means to at least two distinct points inside the hull; and at least one receiving assembly disposed on the outside of the hull and including magnetic field detector means for detecting the magnetic field generated by the current flowing between said two distinct points and amplification means for amplifying the signal generated by said magnetic field detector means.

3. The device as claimed in claim 2, further comprising an electro-acoustic transducer connected to the output of said amplification means.

4. A device for transmitting a variable amplitude signal through the hull of a ship without piercing the hull to effect electrical connection therethrough, comprising at least one transmission assembly to be disposed inside the hull and including current generator means for generating between output terminals thereof a current whose amplitude is proportional to the amplitude of the signal to be transmitted and an electric circuit connecting the output terminals of said current generator means to at least two distinct points inside the hull; at least one receiving assembly disposed on the outside of the hull and including magnetic field detector means for detecting the magnetic field generated by the current flowing between said two distinct points and amplification means for amplifying the signal generated by said magnetic field detector means; an electro-acoustic transducer connected to the output of said amplification means; wherein said current generator means produces an alternating current and comprises two amplifiers adapted for generating currents proportional to the voltages applied to their input terminals, the output terminals of said two amplifiers being connected on the one hand to an electric current supply source through respective ones of two switches each provided with a control input and on the other hand respectively to said two distinct points on the wall of the hull, means for applying said variable amplitude signal and a signal in phase opposition to said variable amplitude signal to the respective inputs of the two amplifiers, and means controlled by said variable amplitude signal for alternately actuating said two switches.

5. The device as claimed in claim 4, wherein said means for actuating said two switches comprise means for transforming said variable amplitude signal into a rectangular wave signal whose input is connected directly to the control input of one of said switches and through an inverter element to the control input of the other switch.

6. The device as claimed in claim 5, wherein said two amplifiers and said two switches are formed by field effect transistors.

7. The device as claimed in claim 3, wherein said amplification means is disposed inside a shaped body fixed to the hull of the ship and said electro-acoustic transducer is positioned for transmitting said generated signal.

8. The transmitting process as claimed in claim 1, wherein the electric current is applied to the conducting wall between two points of application forming said distinct locations on the wall, and further including the step of moving the points of application of the electric current on the surface of the wall.

* * * * *